United States Patent [19]

Boniface et al.

[11] 4,233,755
[45] Nov. 18, 1980

[54] VEHICLE SIMULATOR OPTICAL PICK-UP HEAD

[75] Inventors: John A. Boniface, Lancing; Ronald E. Field, Brighton; Eric C. Gwynn, Hove; William L. A. Turner, North Lancing, all of England

[73] Assignee: The Singer Company, Binghamton, N.Y.

[21] Appl. No.: 11,478

[22] Filed: Feb. 12, 1979

[30] Foreign Application Priority Data

Feb. 14, 1978 [GB] United Kingdom ............... 05879/78

[51] Int. Cl.³ .............................................. G09B 9/04
[52] U.S. Cl. ................................................... 35/11 R
[58] Field of Search .................. 35/11 R, 12 R, 12 N, 35/12 W

[56] References Cited

U.S. PATENT DOCUMENTS

| | | | |
|---|---|---|---|
| 2,579,177 | 12/1951 | Miles | 35/11 R |
| 2,979,832 | 4/1961 | Klemperer | 35/12 N |
| 3,052,753 | 9/1962 | Schwarz et al. | 35/12 N X |
| 3,283,418 | 11/1966 | Brewer et al. | 35/11 R |

*Primary Examiner*—William H. Grieb
*Attorney, Agent, or Firm*—J. Dennis Moore; Jeff Rothenberg

[57] ABSTRACT

A contour following image pick-up head for use in a vehicle training simulator camera/model board visual system. A pivotable mirror 42 is fixedly mounted beneath the camera, while an adjustable shoe 38 which is free to rotate about a pitch axis is positioned beneath the mirror and moves with the camera in contact with the model board. One or more electromechanical transducers 54, 56 detect the pitch movement of the shoe as it traverses the board and produce signals which are used in controlling the pitch of the mirror to produce a realistic visual image corresponding to the view from the vehicle being simulated. The shoe may be given roll and vertical motion freedom and the camera provided with a Dove prism and vertical drive. Electromechanical transducers 48, 54, 56 may then be provided to detect roll and vertical movement of the shoe, and produce signals which may be used to control vertical camera movement and Dove prism movement for improved image realism.

15 Claims, 6 Drawing Figures

VEHICLE SIMULATOR OPTICAL PICK-UP HEAD

DESCRIPTION

1. Technical Field

The present invention relates to vehicle simulator model board visual systems, and more particularly relates to a contour following image pick-up head for use with a camera in such a system.

2. Background Art

Modern, sophisticated vehicle simulators employ visual systems to provide the simulator operator with a realistic visual image corresponding to the view he would have from the vehicle being simulated.

One type of visual system employs a model board which is a miniature replica of an area about which the vehicle being simulated would travel. A camera is mounted above the board and is caused to move about with respect to the board as the simulator operator "drives" the vehicle simulator. To provide the proper perspective, an image pick-up head having a small mirror is mounted to the camera tube.

For example, U.S. Pat. No. 3,283,418 describes a trainer or simulator for assisting in teaching trainee drivers to drive heavy vehicles. The simulator includes a scale relief model of a section of country over which a trainee-driver might be expected to drive the vehicle. A television camera is suspended above the model and can be moved on X and Y coordinates to any desired position over the model. The camera is downwardly directed and carries a pick-up head comprised of a shoe which glides over the model and on which is mounted a mirror at approximately 45° to the vertical. Thus the camera effectively views the model from the mirror position mounted on the shoe to simulate the driver's view. The mirror has to be coupled to the shoe so that pitching movement of the mirror is half that of the shoe to maintain the correct line of sight, as described in that patent. The pitching movement of the shoe is also sensed by a transducer fixed to the back of the shoe. Rolling movement of the shoe is not transmitted to the mirror but is sensed by a transducer affixed to one side of the shoe. A small amount of relative vertical movement is permitted between the shoe and the camera tube, and the mirror is kept at the same height above the model regardless of the model contour by a height servo loop, including a height transducer coupled to the shoe and electrically connected to a height servo motor which moves the camera tube so as to tend to maintain the output of the height transducer constant. The vertical movement between the shoe and the camera tube is kept to an absolute minimum. The shoe and the mirror assembly can be rotated about the vertical axis of the camera tube to adopt any desired heading for the vehicle. As the camera itself does not rotate, this rotation of the mirror would introduce an undesired roll effect into the image transmitted by the camera, and to compensate for this a Dove prism is rotatably mounted on the camera tube and is rotated through half the angle of rotation of the mirror. The Dove prism can also be driven to simulate roll of the vehicle, in response to the roll transducer, and a signal proportional to the roll produced by centrifugal and gravitational forces can be added to this.

Thus the head produces, in conjunction with the camera, an image of the model as seen from the mirror position, which image is correct for heading, roll and pitch. Furthermore electrical outputs representing roll and pitch, and also vertical height, are available. The pitch signal can be used, for example, to vary the simulated engine loading and thus velocity and engine noise.

The system is completed by controls and a visual display for the trainee, the controls being coupled to the visual system via a computer. Details of this system as a whole can be found by reference to the aforementioned U.S. Patent.

While the simulator described has excellent service there are areas where the simulation could be improved. Two important areas are (i) it is not possible to provide realistic visual simulation of the effect of the suspension system of the vehicle, and (ii) it is not practical to take account of different driver's positions in different vehicles. It might, for example, be desired to simulate both left hand drive and right hand drive vehicles. Or, it might be desirable to simulate vehicles in which the driver's position is higher or lower, or more forward or rearward. With the previous simulator such adjustment is inherently impractical, involving as it would offsetting the attachment rod and pitch and roll transducers, as well as the mirror, relative to the attachment rod.

It has been proposed to provide a degree of simulation of vehicle suspension by electronically moving the image seen by the camera up and down. This does not produce a very realistic effect.

SUMMARY OF THE INVENTION

In its broader aspects, the present invention provides a contour following image pick-up head for a vehicle training simulator, having a body, or other framelike structure, designed to be fixedly mounted on a movable member associated with a camera; a shoe, adjustably mounted on the body and which is free to rotate about at least a pitch axis; a mirror located above the shoe and pivotally mounted on the body, for directing a viewed image to the camera; and first sensing means for sensing the pitch of the shoe.

In the narrower aspects of the invention, the adjustable shoe may have freedom of rotational movement about two orthogonal horizontal axes. Second sensing means for sensing the roll of the shoe and third sensing means for sensing the vertical position of the shoe may also be provided. The signals produced by the sensing means may be used in controlling the mirror pivot motion, vertical motion of the camera, and, if a Dove prism is used in the camera optics, Dove prism orientation.

The shoe and the pivot motion sensing means may be mounted on a frame, which in turn may be adjustably, slideably mounted on the body. Thus, by sliding the shoe frame forward or rearward, and left or right, to the desired position, adaptation for a particular driver's position is made, and no further adjustment of mirror or pivot motion sensing means is necessary. Vertical position adjustment may be made by electrically adjusting the neutral point of a height or Z-axis transducer which may also be mounted on the shoe frame for driving a Z axis height control motor. In this way, adjustments for different drivers' positions is particularly simple.

Further, because the mirror is mounted on the body rather than on the shoe, it is thus possible to simulate vehicle suspension visual effects. Probably the most noticeable of these visual effects are damped oscillatory pitch changes. These visual changes may be easily effected by, e.g., feeding the output of the pitch sensing means to a computer which calculates the suspension effects, in a manner well known in the art, and uses the calculated result to modify the mirror pivot motion. As sensing means for roll and Z axis motions may also be made available, a similar arrangement may be provided to modify dove prism drive and Z axis drive to account for suspension effects occuring in each of those modes.

Accordingly, it is an object of the present invention to provide suspension effects in a vehicle simulator model board visual system.

A further object is to provide a contour following pick-up head for use in such a system, which is easily adjustable to accomodate the simulation of vehicles having differing driver locations.

BRIEF DESCRIPTION OF DRAWINGS

These and other features of the present invention will be more clearly understood from consideration of the following description taken in connection with the accompanying drawings in which:

FIG. 4 is a rear view of the head of FIG. 1, with the mirror and its support omitted; while

DETAILED DESCRIPTION OF THE PREFERRED EMBODIMENT

Figure 1:
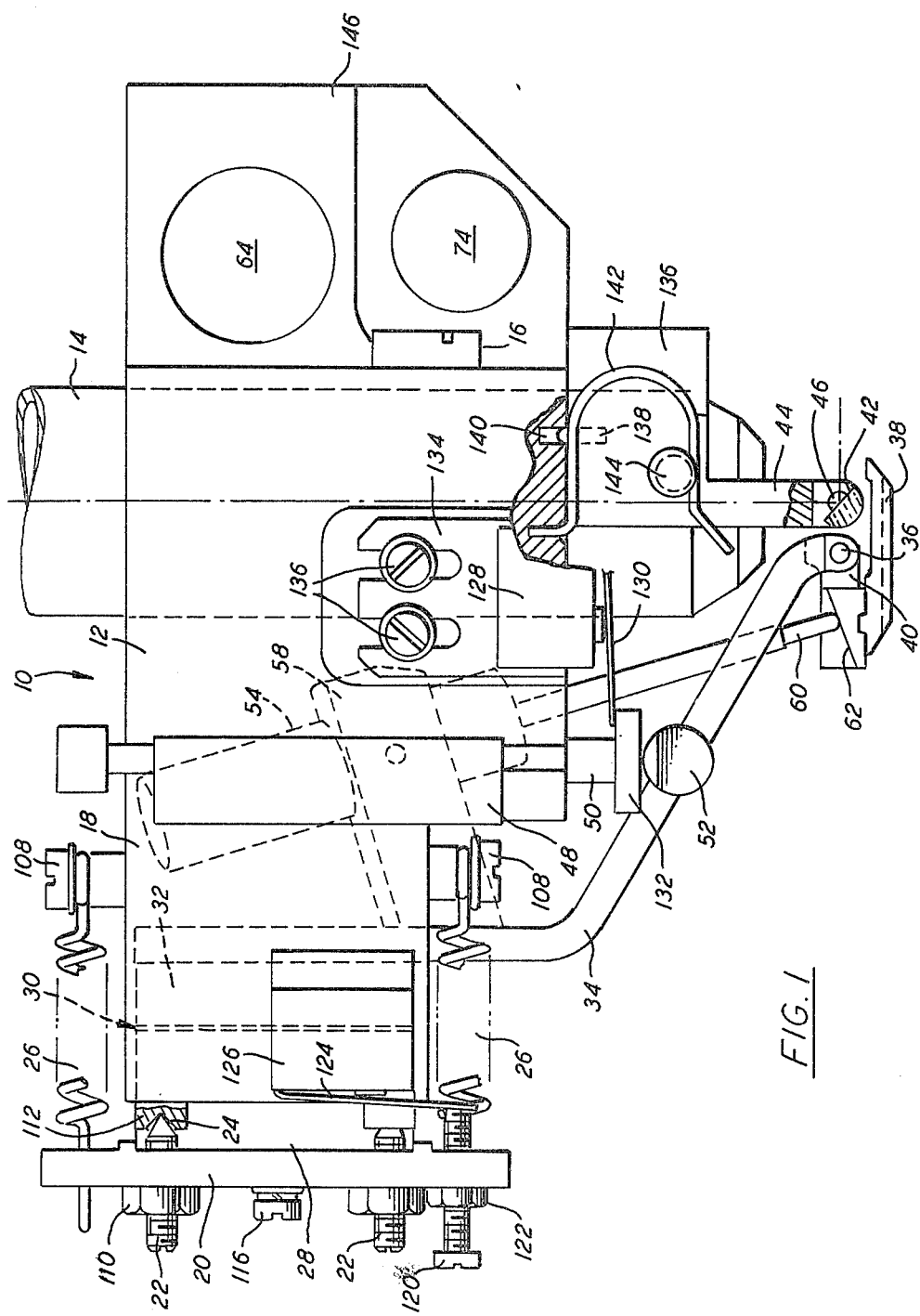
FIG. 1 is a view from the right hand side of a contour following image pick-up head embodying the present invention.
Figure 2:
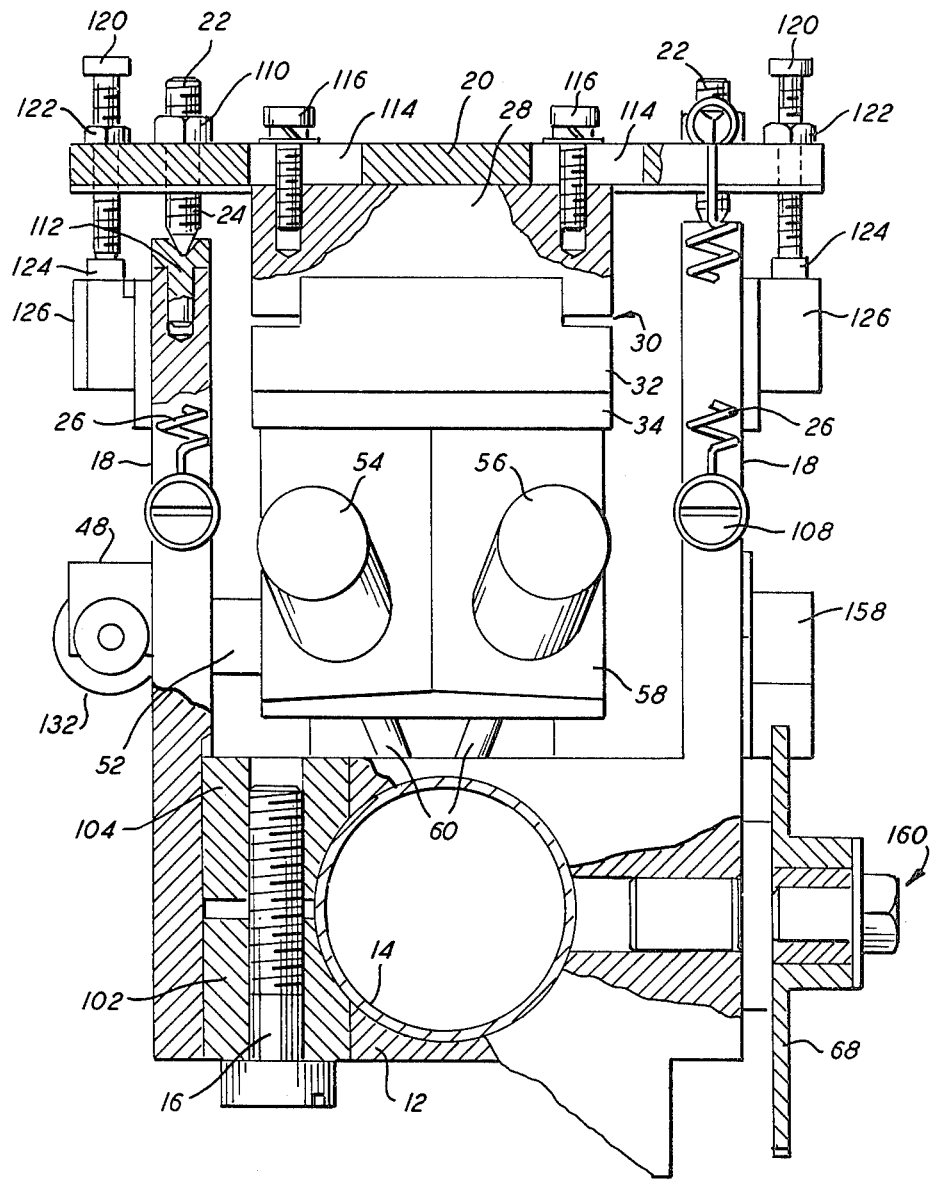
FIG. 2 is a plan view of the head of FIG. 1, partly in sections.
Figure 3:
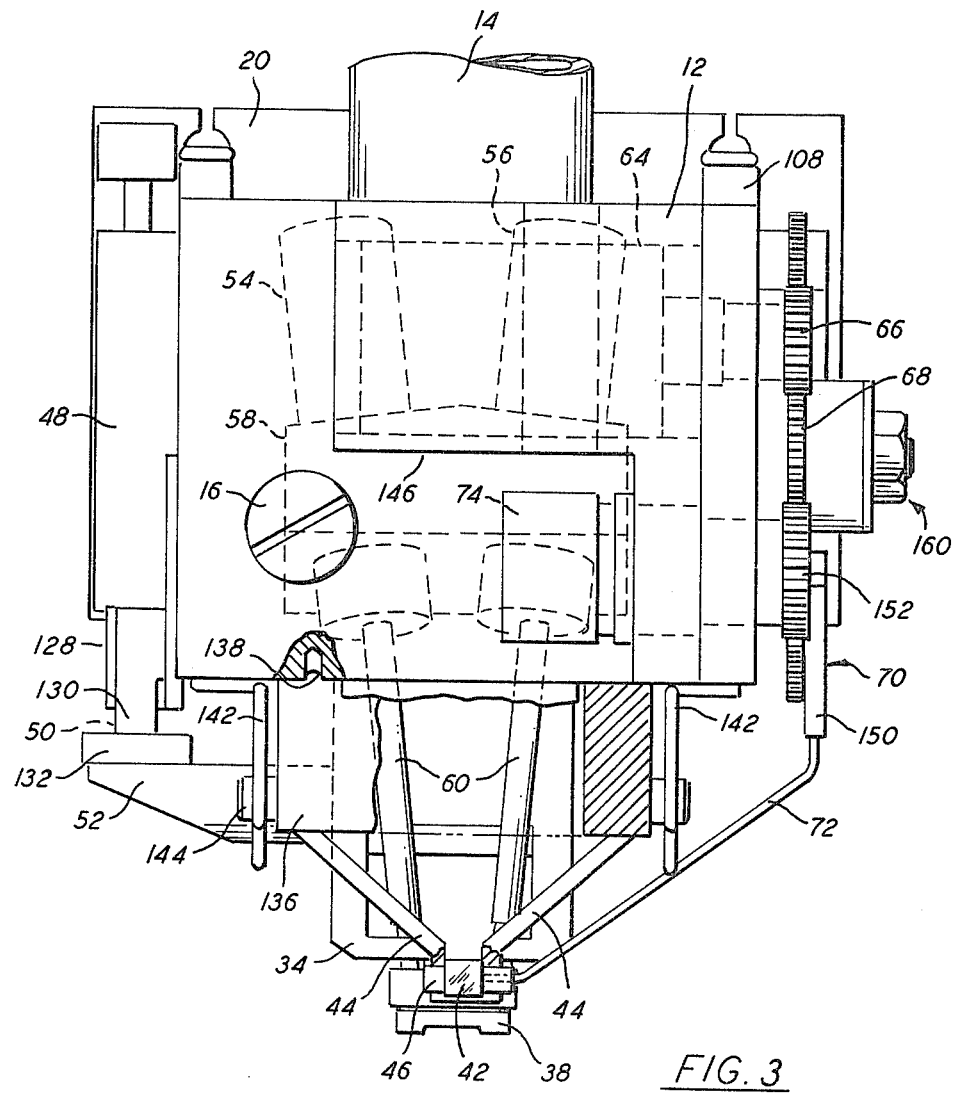
FIG. 3 is a front view of the head of FIG. 1.

Referring to FIGS. 1 to 5, and initially particularly to FIGS. 1 to 3, a head 10 is shown which has a body member 12 which can be clamped about a vertical camera tube 14 by a clamping bolt 16. The body has rearwardly extending wings or flanges 18, on the rear end of which a back plate 20 is mounted by means of bolts 22, received in cup-shaped recesses 24, and springs 26. To the inward side of the back plate 20 is adjustably fixed the stationary part 28 of a sliding table 30. The movable part 32 of the table can slide vertically relative to the stationary part, and carries an arm 34 which is divided towards its free end and terminates in a pivot 36. A shoe 38 is thus pivoted to the arm 34 by means of the transverse pivot 36 and a fore-and-aft pivot 40 to permit pivotal movement of the shoe about orthogonal pitch and roll axes.

A mirror 42 is supported above the shoe by arms 44 fixed relative to the body 12 and is pivotally movable about a transverse pivot 46. The mirror is positioned below the center of the camera tube 14. The mirror 42 can be rotated about its transverse pivot 46 by means of a motor 64 coupled through reduction gearing 66, 68 and a sliding connection 70 to an arm 72. A servo 74 senses the position of the gear 68 and hence of the mirror 42.

A resistive height transducer 48 fixed to the body 12 has an arm 50 which bears on a transverse projection 52 from the arm 34 to sense the height of the shoe relative to the body. Two linear voltage differential transducers (LVDTs) 54 and 56 of known construction are mounted in a mounting block 58 fixed to the moving part 32 of the sliding table 30. The probes 60 of the LVDTs 54 and 56 both bear on the rear end of the shoe 38 symmetrically on either side of the fore-and-aft pivot 40, i.e., in two adjacent quadrants defined by the pivots 36 and 40.

To provide the correct linear response the probes 60 bear on cam surfaces 62 on the shoe.

With this arrangement of the LVDTs, the sum of their electrical outputs will represent pitch of the shoe about the pivot 36, and the difference of their electrical outputs will represent roll of the shoe about the pivot 40.

The shoe 38 bears on the surface of the model under the weight of the sliding table part 32 and arm 34, assisted by the gravity loading of the movable element of transducer 48.

Figure 6:
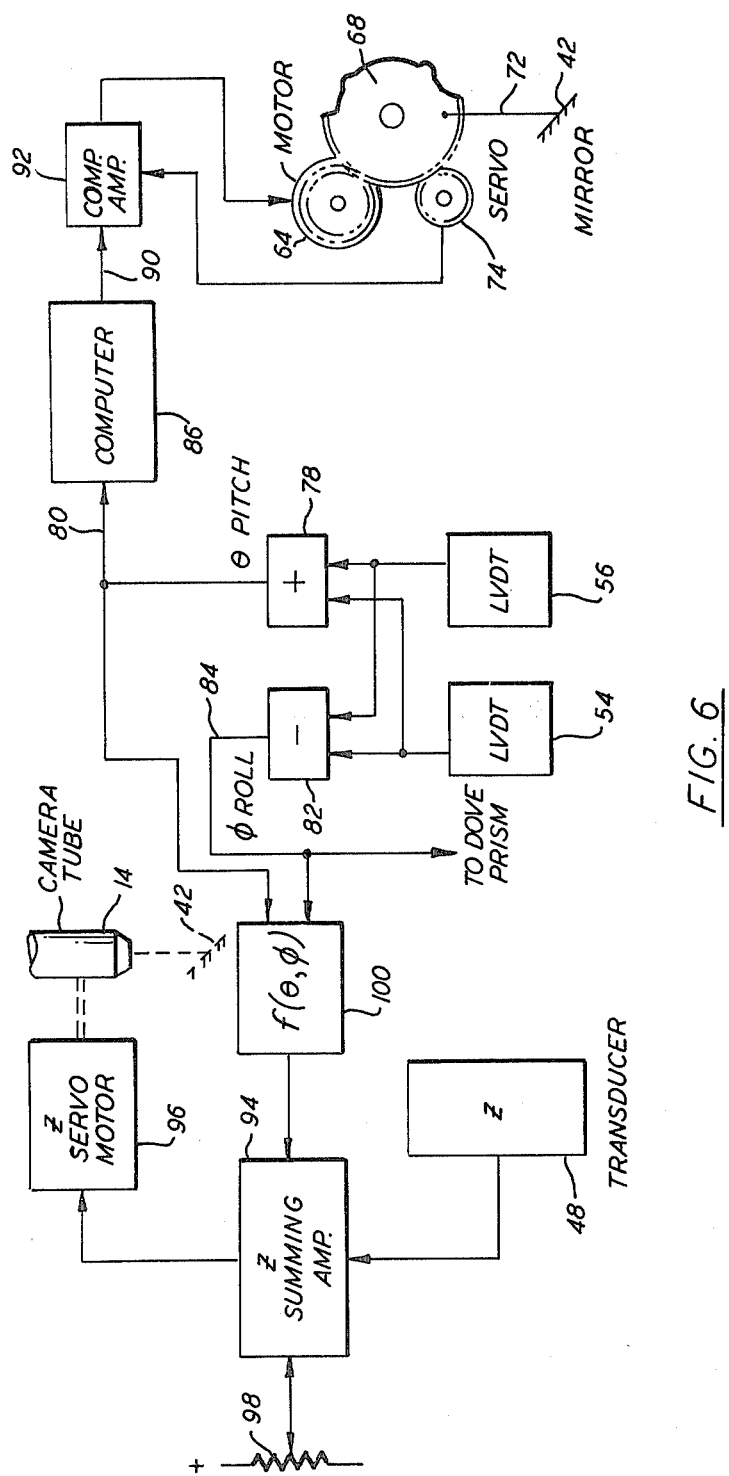
FIG. 6 is a block circuit diagram of a circuit employed in the operation of the present invention.

Before a more detailed description is given of the construction of the head, reference will be made to FIG. 6 which illustrates the electrical circuitry coupled to the head.

The LVDTs 54 and 56 provide outputs which are added in the adder 78 to provide a $\theta$ or pitch output on a line 80 and are subtracted in a subtractor 82 to provide a $\phi$ or roll output on a line 84. Line 80 is connected to the simulator computer as indicated by the block 86. The pitch signal on line 80 is used to change the simulated velocity in accordance with sensed gradient, and to change the simulated engine noise in a manner known in the art. The roll signal on line 84 is used to drive the Dove prism in the camera optics (see, e.g., FIG. 4 of U.S. Pat. No. 3,283,418), subject of possible modification by the computer to simulate sideways suspension effects. The pitch and roll signals can be used to cause the trainee's seat or the cab of the vehicle simulator to pitch and roll in synchronism with movement of the model to simulate the model movement.

A PDP 1105 medium sized computer, made by Digital Equipment Corporation, was used in connection with the implementation of the preferred embodiment. However any suitably sized computer may be used. As computers are essentially of known construction, further details of the construction of computer 86 are not given here.

The pitch signal on line 80 is modified by the computer which can introduce any desired type of suspension effects at the will of the designer. They will normally include some integrating and damped oscillatory components.

In one embodiment, the following simplified equations were used. They represent the pitch and roll accelerations of a vehicle body which is suspended by a number a roadwheels arranged on either side of the vehicle. It is assumed that the suspension springs are linear, the shock absorber damping rates are constant, and that the spring and damping contributions of the roadwheels themselves are insignificant.

Given the above assumptions:
for pitch $$J\ddot{\theta}_v = \Sigma K_n l_n^2 \theta_v - \Sigma S_n l_n^2 \dot{\theta}_v$$

where
J = moment of inertia of vehicle body about pitch axis
$\theta_v$ = vehicle body (spring mass) pitch angle
n = roadwheel station number
K = spring rate
l = roadwheel arm length from the vehicle body center of gravity
S = shock absorber damping rate
and for roll $$I\ddot{\phi}_v = -2\Sigma K_n l^2 \phi_v - 2\Sigma S_n l^2 \dot{\phi}_v$$

where
- I = moment of inertia about the roll axis
- $\phi_v$ = Vehicle body (spring mass) roll angle
- l = roadwheel arm length from (center line) center of gravity.

These effects can be modified by the computer in accordance with other factors, example of which might be vehicle load, ground surface conditions, vehicle roll, and speed.

The output 90 from the computer thus provides a signal representing the desired angle of view from the driver's seat which is used to drive the mirror. A servo loop is formed by a comparator/amplifier 92 which receives the output of servo 74 which senses the mirror position, compares it with the signal on line 90, and drives the motor 64 accordingly. This pivots mirror 42 via gear 68 and arm 72.

The height or Z transducer 48 is connected to a summing amplifier 94 which is in turn connected to a Z servo motor 96 which controls the height of the camera tube 14, and conveniently of the whole camera (not shown). It will be appreciated that a powerful motor is required as the response time must be short and the weight to be moved is considerable. The Z summing amplifier 94 receives inputs not only from the transducer 48 but also from a potentiometer 98 which sets the desired mirror (or eye level) datum position, and from a function circuit 100 connected to receive the outputs of adder 78 and subtractor 82. Function circuit 100 implements basic trigonometric functions according to the particular mirror position. This is necessary because the pivot axes for the shoe are not coincident with the mirror. For example, if the shoe pitches backwards about pivot 36 then the mirror 42 will unless corrective action is taken come closer to the shoe. The required corrective action is for the mirror to be raised slightly, and this is achieved by function circuit 100 operating on summing amplifier 94 in a manner well known in the art. A similar effect arises as the shoe rolls.

The suspension function circuit can receive from the computer a function of pitch and roll to give the desired suspension characteristics for the vehicle being simulated. These again are chosen at the will of the designer.

By virtue of the separate mounting of the mirror 42 and the shoe 38 it is thus possible to introduce realistic suspension effects into the system. It is also thus possible, by adjusting potentiometer 98, to account for various drivers' eye levels.

Figure 4:
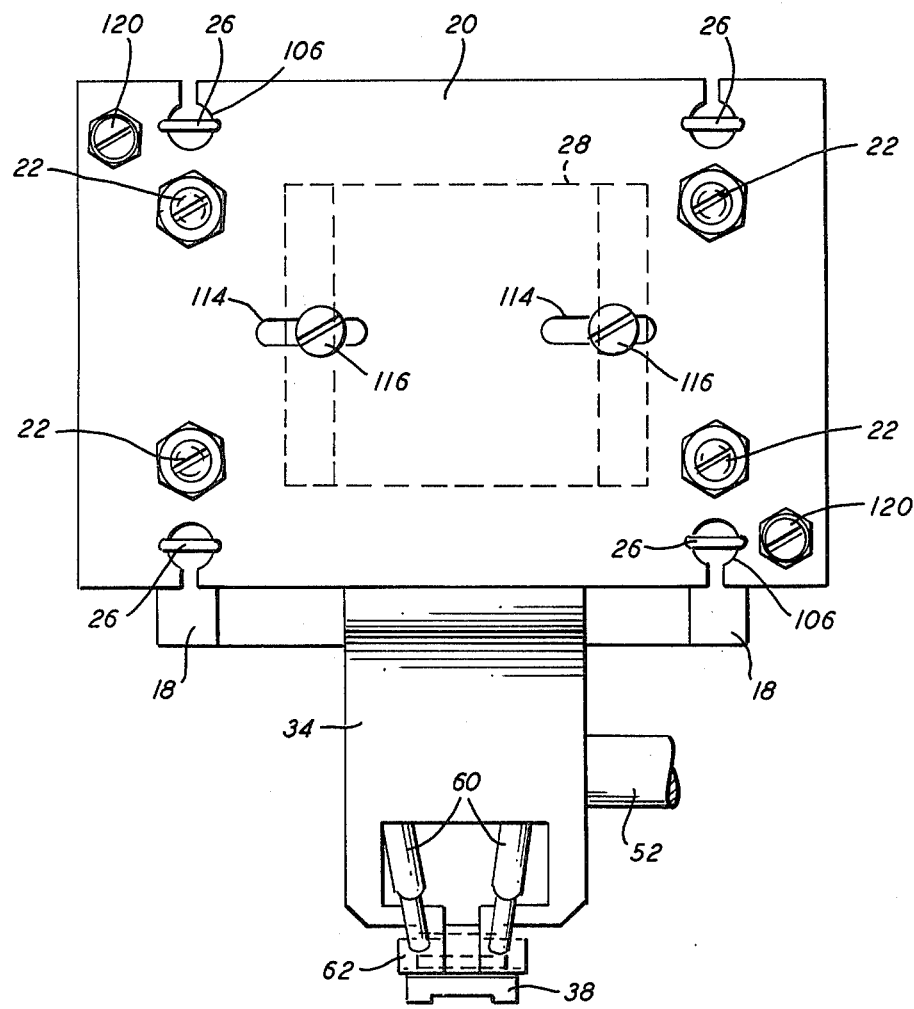

The more detailed construction of the head will now be described. The body 12 is a machined alloy member in which are fitted two coaxial insets 102 and 104 (FIG. 2); the inset 104 being threaded to receive the clamping bolt 16. Tightening of the clamping bolt 16 draws the insets together thus wedging them hard against the camera tube 14 and thereby fixing the body 12 on the tube 14. The flanges 18 are integral with the body 12. The back plate 20 is, as previously mentioned, held on the vertical rear ends of flanges 18. The springs 26 extend between slots 106 in the back plate and anchorages 108 on the top and bottom of each flange. Four springs 26 are shown, though in practice only two diametrically opposed springs (as seen in FIG. 4) are required. The bolts 22 are threaded through the back plate 20 and carry lock nuts 110. The recesses 24 within which the bolts 22 are received are formed in the rear ends of the flanges 18 by insets 112 received in bores therein. If all four locks nuts 110 are loosened, the bolts 22 can be screwed in or out together to move the shoe 38 fore or aft relative to the mirror 42. This enables simulation of vehicles in which the driver is at different positions in front of the pitching axis. The back plate 20 has two transverse slots 114. Bolts 116 pass through these slots into the stationary part 28 of table 30 to fix the stationary part of the table to the back plate. If bolts 116 are loosened then the table 30 can be adjusted transversely relative to the body 12. This enables simulation of vehicles in which the driver is at different positions to the side of the roll axis. It will be seen that both the two just-described adjustments can be made at a part of the head which is relatively accessible.

The arm 34 is bolted onto the sliding part 32 of the table 30, and the LVDT mounting block 58 is bolted to the arm 34. These bolts are not shown. The LVDTs 54 and 56 are set at a slight angle to each other and to the vertical to allow sufficient space to accommodate their bulk.

The shoe 38 is replaceable to allow the shape of the vehicle "footprint" to be changed, to simulate different vehicles. The shoe illustrated represents a military tank, for example.

If the shoe hits an immovable part of the model, damage could be caused to the model or the shoe, and for this reason protection devices have to be included. It will be seen that the back plate 20 carries two diametrically opposed bolts 120 secured by locknuts 122 which each bear on the arm 124 of a microswitch 126 (FIG. 2). The only force holding the back plate 20 onto the flanges 18 is that provided by the springs 26; thus if the shoe is subjected to a force greater than a value set by the springs, the back plate will tend to lift off the flanges. Any such movement will cause one of the microswitches 126 to open, and this immediately signals a danger situation and stops the exercise. Another danger condition will arise if the shoe 38 rises too high, to a position where it could hit the mirror 42. For this purposes a microswitch 128 is provided which has an arm 130 which engages a boss 132 at the lower end of the sensing arm 50 of the height transducer 48. The microswitch 128 is attached to a plate 134 which is adjustably mounted on the body 12 by bolts 136.

The microswitch 128 needs careful setting because pitching of the shoe 38 will alter the height of pivot 36 at which the shoe engages the mirror. A compromise position must be selected. In a modified arrangement, not shown, the microswitch 128 is omitted. Instead the shoe is allowed to contact the mirror support which is made strong enough to withstand the forces applied. In this way undesired vertical forces are transmitted to the body 12. The body 12 is now mounted on the camera tube 14 by means of a sprung detent which normally holds the body fixed in position on the tube, but which will give in response to undesired vertical force to permit the body to ride up on the tube 14. This movement is sensed by a microswitch on the top of the body 12. Actuation of this microswitch again stops the exercise, and also causes the camera tube 14 to be raised automatically.

As noted above, the mirror 42 is supported by arms 44. These arms 44 are secured to a mounting block 136. The mounting block 136 is located in the correct position underneath the body 12 by locating pins 138 engaging in recesses 140 in the block 12. The block 136 is held on the block 12 by two springs 142 which are fixed in the block 12 and locate round pins 144 on either side of the block 136. In this way, if the mirror hits an obstruction it can give against the springs so as not to damage the obstruction or the mirror. Although not shown, a microswitch could be provided to detect this movement and stop the exercise.

Figure 5:
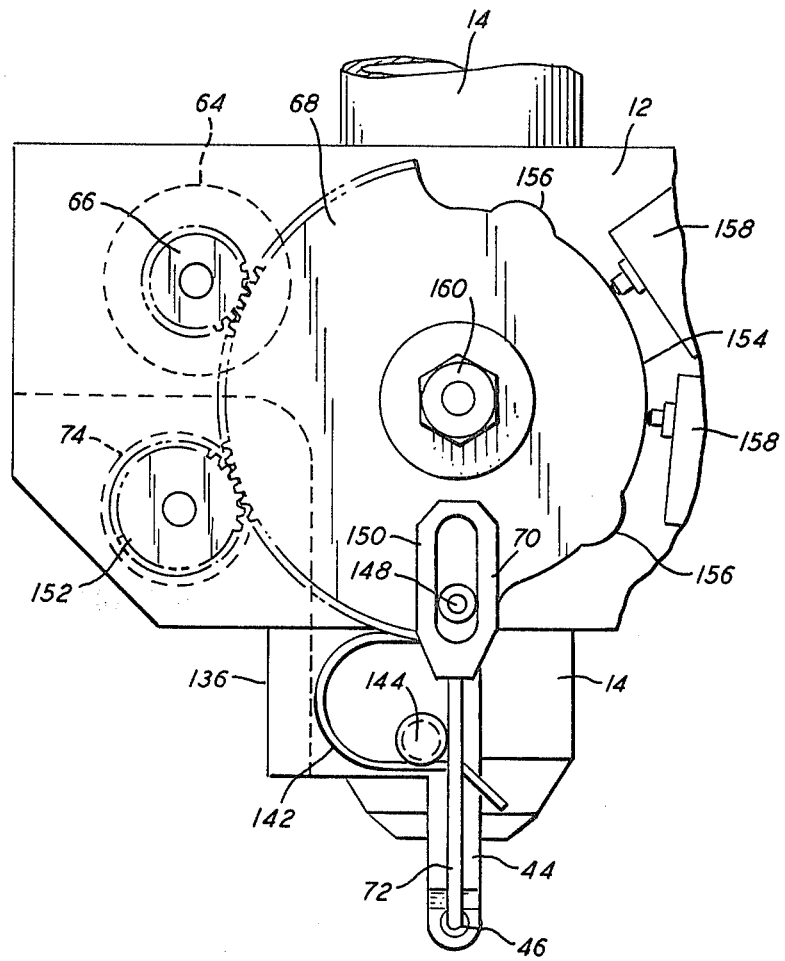
FIG. 5 is a partial view of the left hand side of the head of FIG. 1.

As seen from FIGS. 1 and 3, the body 12 has a foreward extension 146 which carries the motor 64 and servo 74. Referring to FIGS. 3 and 5, the motor 64, reduction gears 66, 68 and connection 70 are seen. The connection 70 includes a pin 148 mounted on gear 68 and a slotted extension 150 to arm 72 into which the pin 148 engages. Rotation of gear 68 is communicated to servo 74 by a gear 152. The shape of arm 72 can be altered so as to conform more closely to the overall outline of the shoe and mirror support structure, thus reducing its overall profile. The right-hand part of gear 68, as seen in FIG. 5, is not toothed but instead provides a cam surface 154. Two projections 156 on this surface can cause actuation of two respective microswitches 158, which act as limit detectors to signal if the mirror pivots out of a defined operational range.

Gear 68 is secured to body 12 by a threaded structure 160 shown in FIG. 2. If space permitted, the servo unit 74 could include the amplifier 92 shown in FIG. 6.

The present invention thus provides a camera contour following pick-up lead with greatly improved flexibility over the prior art. Allowance is now possible for various drivers' positions in the vehicle being simulated, and suspension effects may now be accounted for to a high degree of accuracy.

While there have been described what is at present considered to be preferred embodiments of this invention, it will be obvious to those skilled in the art that various changes and modifications may be made therein without departing from the invention, and it is therefore intended to cover herein all such changes and modifications as fall within the true spirit and scope of the invention as defined by the claims appended hereto.

What we claim is:

1. A visual pick-up head for use in a vehicle simulator system having a model board surface and movable camera, including an optical system, for visual image generation, comprising:
   (a) a body, including means for mounting said body in a substantially fixed space relation with respect to the camera;
   (b) a shoe moveably, adjustably attached to said body and having pivotal freedom of movement about a first, lateral horizontal pitch axis, for contacting the model board surface and traversing said surface as the camera moves;
   (c) a mirror attached to said body above said shoe, and pivotable about a horizontal axis, for directing an image to the optical system of the camera;
   (d) first sensing means for sensing pitch of said shoe; and
   (e) tilt means associated with said first sensing means for rotating said mirror about its pivotal axis.

2. The pick-up head of claim 1 wherein said tilt means further comprises first coordinating means responsive to said first sensing means for coordinating said mirror rotation with said shoe movement to cause the directed image to correspond to the view from the vehicle being simulated.

3. The pick-up head of claim 2 further comprising means in associated with said first sensing means and said tilt means for imparting motion to said mirror so as to cause the generated visual image to move in accordance with the view of a driver of a vehicle having a spring suspension system.

4. The pick-up head of claim 1 wherein said first sensing means comprises an electro-mechanical transducer mounted on said mounting means in mechanical cooperation with said shoe.

5. The pick-up head of claim 1 wherein the optical system of the camera includes a driven movable Dove prism to produce roll effects, wherein said shoe is further provided with pivotable freedom of movement about a second, longitudinal roll horizontal axis, and wherein said head further comprises second sensing means for sensing roll of said shoe whereby signals representative of the roll of the vehicle being simulated are made available for the implementation of further simulated affects.

6. The pick-up head of claim 5 further comprising second coordinating means responsive to said second sensing means for coordinating the movement of the Dove prism with shoe movement to cause the visual image to roll in accordance with the roll of the vehicle being simulated.

7. The pick-up head of claim 5 wherein said second sensing means comprises an electro-mechanical transducer mounted on said mounting means in mechanical cooperation with said shoe.

8. The pick-up head of claim 1 wherein the movable camera has associated with it vertical drive means for moving the camera along its vertical axis, wherein said shoe is further provided with vertical freedom of movement, and wherein said head further comprises third sensing means for sensing the vertical movement of said shoe.

9. The pick-up head of claim 8 further comprising third coordinating means in association with the vertical drive means and responsive to said third sensing means for coordinating the vertical movement of the camera with vertical shoe movement.

10. The pick-up head of claim 8 further comprising means for selectively adjusting a neutral position for said shoe about which said shoe moves up and down in accordance with the contour of the portion of the model board surface being traversed, whereby different drivers' heights and vertical positions within the vehicle being simulated may be compensated for in the visual image being generated.

11. The pick-up head of claim 8 wherein said third sensing means comprises an electro-mechanical transducer mounted on said mounting means in mechanical cooperation with said shoe.

12. The pick-up head of claim 7 further comprising fourth coordinating means in cooperation with the vertical drive means and responsive to said first sensing means for coordinating the vertical movement of the camera with the pitch movement of said shoe.

13. The pick-up head of claim 7 further comprising fifth coordinating means in cooperation with the vertical drive means and responsive to said second sensing means for coordinating the vertical movement of the camera with the roll movement of said shoe.

14. The pick-up head of claim 1 wherein said mirror is attached to said mounting means by means of a pivot, and wherein said tilt means comprises:
   (a) a rigid member moveably mounted on said mounting means;
   (b) a pin attached to said rigid member;
   (c) an arm fixedly attached at one end to said pivot and slideably attached to said pin at the other end; and (d) drive means for moving said rigid member with respect to said mounting means whereby the movement of said member causes said mirror to rotate about said pivot.

15. The pick-up head of claim 1 further comprising means for moving said shoe fore and aft, and side to side to a selectable fixed position relative to said body whereby provision is made for different drivers' positions within the vehicle being simulated.

* * * * *